Figure 3:
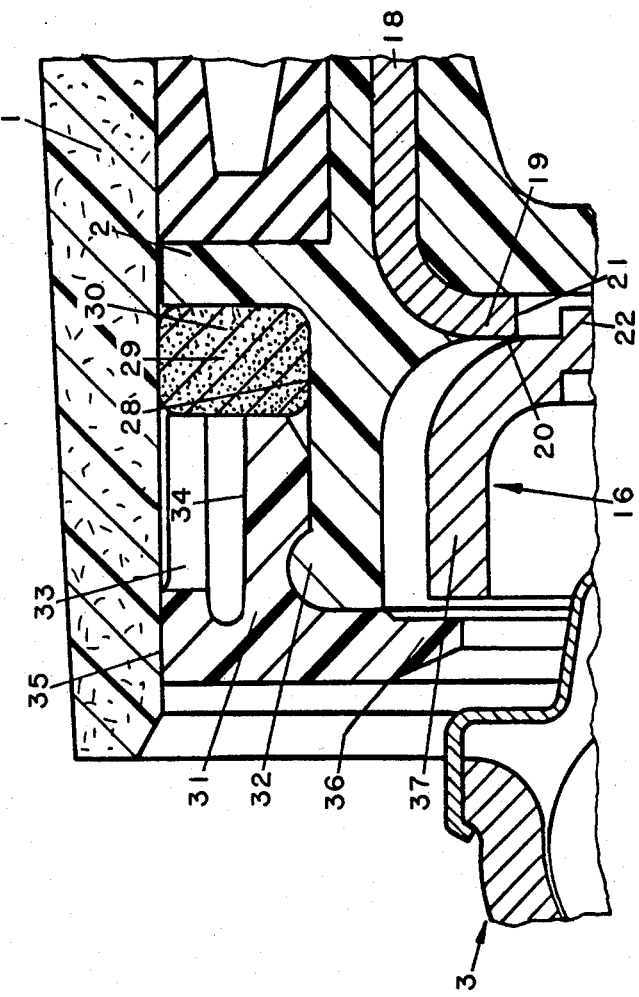

United States Patent [19]

Brandenstein et al.

[11] Patent Number: 4,509,764
[45] Date of Patent: Apr. 9, 1985

[54] SEALING ARRANGEMENT

[75] Inventors: Manfred Brandenstein, Eussenheim; Rüdiger Hans, Niederwerrn; Heinz Kiener, Waigolshausen, all of Fed. Rep. of Germany

[73] Assignee: SKF Kugellagerfabriken GmbH, Schweinfurt, Fed. Rep. of Germany

[21] Appl. No.: 429,292

[22] Filed: Sep. 30, 1982

[30] Foreign Application Priority Data

Nov. 12, 1981 [DE] Fed. Rep. of Germany ... 8133054[U]

[51] Int. Cl.³ .............................. F16N 1/00; F16J 15/00
[52] U.S. Cl. .................................... 277/166; 92/15; 92/3; 277/184
[58] Field of Search .......................... 92/248, 249, 153; 277/166, 184, 152, 134

[56] References Cited

U.S. PATENT DOCUMENTS

| 3,055,720 | 9/1962 | Price ........................................ 92/249 |
| 3,307,885 | 3/1967 | Cox .......................................... 277/166 |
| 3,440,122 | 4/1969 | McCormick .......................... 277/184 |
| 4,005,763 | 2/1977 | Wallis ..................................... 92/153 |

FOREIGN PATENT DOCUMENTS 2144681 8/1972 Fed. Rep. of Germany.

Primary Examiner—Robert I. Smith
Attorney, Agent, or Firm—Daniel M. Rosen

[57] ABSTRACT

An hydraulically operated clutch release has an annular piston hydraulically moveable in an annular chamber. A felt ring is mounted on a shoulder of the piston away from the chamber, to engage the bore surface of the chamber, and a holding ring is snapped onto the end of the shoulder to hold the felt ring on the shoulder. An extension of the holding ring forms a seal with the bore on the chamber, and defines, with the felt ring a dust catching recess.

7 Claims, 3 Drawing Figures

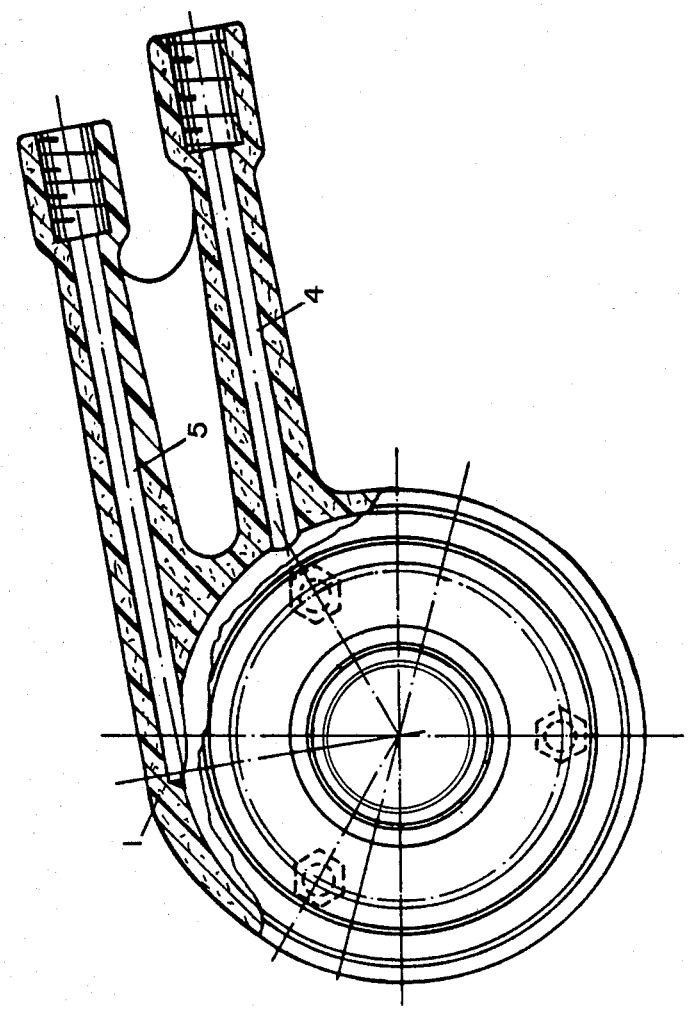
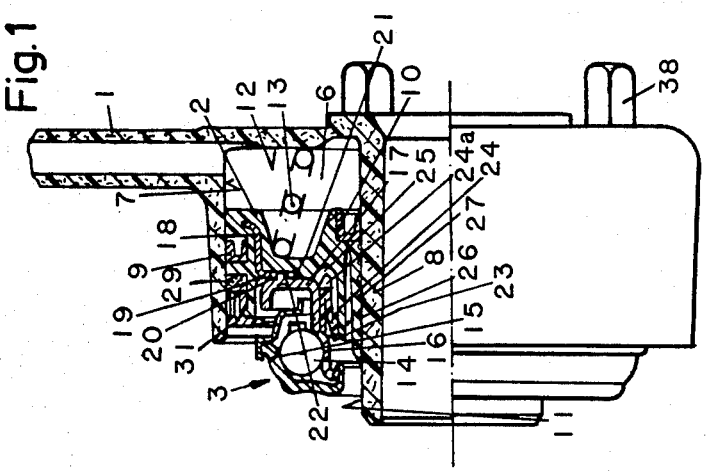

SEALING ARRANGEMENT

This arrangement relates to a sealing arrangement, especially for hydraulically operating clutch releases in motor vehicles, which seal the space between a cylinder housing and a piston on the side away from the pressure space against dust and dirt particles.

It is generally known that the space between a piston and a cylinder in forward piston regions can be sealed by a gap seal or by a sealing ring of plastic material or the like.

These known seals cannot adequately fulfill their dirt and dust repelling functions, however, in many cases.

It is therefore the object of the present invention to provide a sealing arrangement, especially for hydraulically operating clutch releases in motor vehicles, which ensure a good seal in the forward piston regions and take up leakage from the pressure space.

This object is solved in accordance with the invention in the manner, that a felt ring or the like of preferably rectangular cross-section is arranged on a shoulder, and with one side surface on a radial surface of a piston or the like, that the felt ring has an outer diameter, that is greater than the outer diameter of the piston or the like in the non-assembled condition, and that a holding ring is provided for the felt ring, connected to the piston and on the radial surface of the piston or the like directed away from the side of the felt ring, the holding ring having a sealing surface as well as an annular recess opened toward the bore surface of the cylinder space for the forming of a dust-retaining chamber between the felt ring and the sealing surface.

An embodiment of the invention is illustrated in the drawings and described more precisely in the following disclosure:

They show;

FIG. 1 a hydraulic clutch release with the sealing arrangement of the invention in section, FIG. 2 the side view of the housing shown in FIG. 1, FIG. 3 an enlarged partial section of the clutch release with the sealing arrangement.

The hydraulically operable clutch release illustrated in FIGS. 1 through 3 consists of a housing 1, an annular piston 2 and a clutch thrust bearing 3. The housing 1, for example of glass fiber-reinforced plastic, is provided with a bore 4 for the supplying of a pressure medium and a pressure release bore 5, which opens in the annular cylinder space 6 filled with a pressure medium. The piston 2 which is inserted in the housing bore 7 and displaceably guided on a sleeve-shaped shoulder 8 of the housing 1 is provided with at least one collar seal 9, 10 on the surface and in the bore sealing of the cylinder space 6, arranged in a groove or recess on the outer surface and in the bore of the piston 2 and engaging the bore surface 7 and outer surface 11 respectively of the annular cylinder space 6 with sealing lips. A spring 13 is arranged between the bottom surface 12 of the housing 1 and the piston 2, which serves for biasing the clutch release 3 in the form of an angular contact ball bearing, so that the rolling bodies 14 are constantly held in contact with the races of the outer ring 15 and the inner ring 16. The inner ring 16 is extended in the axial direction on the side away from the clutch, radially outwardly angled, and bent back in the axial direction toward the clutch at its outer rim. The radially extending section 17 of the inner ring 16 radially displaceably engages the piston 2. A strengthening ring 18 of sheet metal having an L-shaped cross section is cast integrally in the piston 2, the ring 18 projecting out from the piston body with a radially directed section 19 and serving as a contact surface 20 for the clutch thrust bearing 3. Several recesses 21 are provided distributed about the circumference of the radially directed section 19, which the projections 22 formed in the inner ring 16 engage and serve as a limit stop for large radial displacment and for limiting of the inner ring 16 in the circumferential direction. A plastic damping ring 23, produced by molding or injection molding, is arranged in the bore of the inner ring, and has a row of elastic tongues 24 in its bore, which are angled back to the clutch thrust bearing and serve for damping the radial movement of the clutch thrust bearing 3. The damping ring 23 is moreover alternately provided with resilient and massive projections 24a, which engage recesses 25 of the piston 2 which is ensured against turning by suitable measures. The resilient projections thereby serve for the damping of bearing movement against the turning direction, while the bearing movement in the turning direction is damped by the massive projections 24a. The piston 2 is provided with an annular recess 26 extending from the sides toward the clutch, so that automatic alignment of the piston 2 in the cylinder space 6 of the housing 1 is possible. In addition grooves 27 are provided in the bore of piston 2, in which dust and dirt particles are caught on the sliding surface 11. A prelubricated felt ring 29 with a rectangular cross-section is arranged on a shoulder 28 of the piston 2, which in the non-assembled condition has a larger outer diameter than the piston 2 and is supported on one side on a radial surface 30 of the piston 2. On the other side the felt ring is supported by a holding ring 31, for example of plastic, which is snapped to an annular bead 32 of the piston 2 and holds the felt ring 29 in an erect position with formed axially directed projections 33. The annular recess 34 open toward the bore surface 7 below the projection 32 serves as a dust chamber. It has been found, that the felt ring 29 absorbs the leakage from the cylinder space 6, which, as soon as the hydraulic piston 2 is not in operation, evaporates relatively rapidly. The holding ring 31 is provided with a sealing surface 35, which engages the bore surface 7 of the cylinder space 6 with minimum play. In addition the holding ring has a radially inwardly directed projection surface 36 which engages the axially directed section of inner ring 16 with play so that clutch thrust bearing 3 and the piston 2 are connected as a unit. The housing 1 is provided outwardly with several projections 38 having six-sided cross-sections, distributed about its circumference for affixing the housing 1 to an adjoining element (not shown), which projections are pressed into corresponding holes of the adjoining housing part (not shown). The hexagonal shape of the projections 38 has the advantage that these can be pressed into a bore with interference, so that the squeezed out material can settle in the free space between the projections 38 and the bore of the housing part or the like.

The described embodiment discloses only one example of the novel sealing arrangement. Changes in the construction of the individual elements are possible within the scope of the invention without further description.

We claim:

1. In a sealing arrangement for sealing the space between a cylinder and a piston or the like on the side thereof directed to the pressure space, against dust and dirt particles, the improvement comprising a felt ring or the like having a rectangular cross-section with one side engaging a shoulder of the piston and with another side surface abutting a radial surface of the piston or the like, the felt ring having an outer diameter, which in the noninstalled condition is larger than the outer diameter of the piston or the like, and further comprising a holding ring for the felt ring, the holding ring being connected to the piston, on the side of the felt ring directed away from the radial surface of the piston or the like, the holding ring having a sealing surface engaging the cylinder as well as an annular recess opening toward the bore surface of the cylinder space for forming a dust chamber between the felt ring and sealing surface.

2. The sealing arrangement according to claim 1, wherein the holding ring in the region of the annular recess is provided with axially directed projections formed thereon, which engage the facing surface of the felt ring.

3. The sealing arrangement according to one of claims 1 or 2, wherein the holding ring is arranged on an annular bead of the piston or the like.

4. The sealing arrangement according to claim 1 for a hydraulically operated clutch release, the clutch release having a bearing with an inner ring, wherein the holding ring has an encircling radially inwardly directed projection on the side toward the clutch, which engages an axially directed section of the inner ring with play.

5. In a sealing arrangement for an hydraulically operating clutch release wherein an hydraulically operated piston is axially moveable in the bore of a chamber and coupled to axially move a clutch release bearing positioned at one side thereof, the improvement wherein said piston has a radially outer shoulder on said one side, said shoulder having radially and axially extending surfaces, a felt ring positioned on said shoulder engaging said radially and axially extending surfaces, said felt ring having a larger outer diameter than the diameter of said bore before assembly of said felt ring in said bore, and a holding ring mounted on said shoulder at said one end of said piston for holding said felt ring on said shoulder, said holding ring having a portion engaging said bore to serve as a seal, said holding ring further defining a dust chamber adjacent said felt ring.

6. The sealing arrangement of claim 5 wherein said shoulder has an annular bead at one end thereof, said holding ring being snapped onto said bead.

7. The sealing arrangement of claim 5 wherein said holding ring has a projection extending axially to engage said felt ring, and a flange extending radially outwardly to serve as a seal against said bore, said flange and projection defining said dust chamber.

* * * * *